(12) United States Patent
Iwamiya

(10) Patent No.: US 8,653,782 B2
(45) Date of Patent: Feb. 18, 2014

(54) MOTOR DRIVING DEVICE

(75) Inventor: Hironori Iwamiya, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/424,470

(22) Filed: Mar. 20, 2012

(65) Prior Publication Data

US 2012/0249037 A1    Oct. 4, 2012

(30) Foreign Application Priority Data

Apr. 4, 2011   (JP) .................................... 2011-82713

(51) Int. Cl.
*G05B 11/28*    (2006.01)
*H02P 27/08*    (2006.01)

(52) U.S. Cl.
USPC ................ 318/811; 318/599; 361/23; 361/30

(58) Field of Classification Search
USPC ............ 318/400.1, 599, 798.8, 801, 808–811
See application file for complete search history.

(56) References Cited

U.S. PATENT DOCUMENTS 6,512,346 B2 * 1/2003 Yoshimura .................... 318/599
2001/0030524 A1 10/2001 Yoshimura

FOREIGN PATENT DOCUMENTS

JP    A-H11-150976    6/1999
JP    A-2002-58288    2/2002

\* cited by examiner

*Primary Examiner* — Eduardo Colon Santana
*Assistant Examiner* — Devon Joseph
(74) *Attorney, Agent, or Firm* — Posz Law Group, PLC

(57) ABSTRACT

In a motor driving device, a driving switching element is connected in series with a motor between a power source and a ground, and operated by a PWM signal outputted from a control circuit. A return current path forming unit is connected in parallel with the motor to allow a return current when the driving switching element is turned off. A series circuit of a current flow restriction element and a switch is connected in parallel with the return current path forming unit. A disconnection determination unit prohibits output of the PWM signal and closes the switch of the series circuit when a voltage applied to the motor does not fluctuate according to the PWM signal, and determines the disconnection of the motor on condition that the voltage detected in that state indicates a change across a second threshold.

7 Claims, 11 Drawing Sheets

NORMAL STATE

E.M.F. GENERATED STATE
(E.M.F. > Vth1)

DISCN GENERATED STATE

NORMAL STATE

E.M.F. GENERATED STATE
(E.M.F. > Vth1)

DISCN GENERATED STATE

NORMAL STATE

E.M.F. GENERATED STATE (E.M.F. > Vth1)

DISCN GENERATED STATE

NORMAL STATE

E.M.F. GENERATED STATE
(E.M.F. > Vth1)

DISCN GENERATED STATE

MOTOR DRIVING DEVICE

CROSS REFERENCE TO RELATED APPLICATION

This application is based on Japanese Patent Application No. 2011-82713 filed on Apr. 4, 2011, the disclosure of which is incorporated herein by reference.

TECHNICAL FIELD

The present disclosure relates to a motor driving device that drives a motor by a pulse modulation width (PWM) control.

BACKGROUND

A motor driving device that drives a motor as an inductive load by operating a semiconductor switching element such as a MOSFET connected in series with the motor under a PWM control has been known. In such a motor driving device, further, it has been proposed to have a function of detecting the disconnection of the motor. For example, the disconnection of the motor is detected based on a fact that an electric current for the motor does not flow and a PWM signal is not outputted toward the motor when the motor is disconnected. In such a detection, however, in a case where the motor is employed as a fan motor of a vehicle, if the motor rotates due to disturbance such as the wind, an electromotive force is generated at a winding of the motor. As a result, the disconnection is erroneously detected because PWM oscillation to the load is seemingly stopped.

For example, JP2001-298988A, which corresponds to U.S. Pat. No. 6,512,346, describes a motor driving apparatus having a disconnection detection function. In the described apparatus, a resistor element is connected in parallel with a transistor that drives a motor, and a voltage at a common connecting point between the motor and the transistor is monitored. When a state where the voltage does not fluctuate according to a control signal (PWM signal) continues over a predetermined period of time, it is determined that the motor is disconnected. Further, when a driving voltage detected by an average voltage detection circuit exceeds a target driving voltage, the output of the control signal is stopped, whereby to avoid erroneous detection.

SUMMARY

It is an object of the present disclosure to provide a motor driving device capable of accurately detecting the disconnection of a motor without increasing a dark current.

In a motor driving device according to an aspect, a driving switching element is connected in series with the motor between a power source and a ground, and operated according to a pulse width modulation signal outputted from a control circuit to drive the motor. A return current path forming unit is connected in parallel with the motor and provides a current path to allow a return current when the driving switching element is turned off. A series circuit, which includes a current flow restriction element and a switch connected in series with the current flow restriction element, is connected in parallel with the return current path forming unit. A disconnection determination unit prohibits the control circuit from outputting the pulse width modulation signal and closes the switch of the series circuit when it is determined that a voltage without having fluctuation according to the pulse width modulation signal is applied to the motor as a result of comparing a voltage detected at a common connecting point between the motor and the driving switching element with a first threshold, and determines that the motor is disconnected on condition that the voltage detected in a state where the output of the pulse width modulation signal is prohibited and the switch of the series circuit is closed indicates a change across a second threshold.

In such a structure, the disconnection determination unit prohibits the output of the PWM signal when the output voltage does not fluctuate according to the PWM signal as a result of comparing the output voltage with the first threshold, because there is a possibility that the motor is disconnected in that state. Further, the disconnection determination unit determines the disconnection of the motor when the output voltage detected in the state where the switch of the series circuit is closed indicates the change across the second threshold. Here, "change across the second threshold" includes a change where the output voltage changes from a value greater than the second threshold to a value lower than the second threshold, and a change where the output voltage changes from a value lower than the second threshold to a value higher than the second threshold. That is, "change across the second threshold" means a change where the second threshold exists between a potential before the output voltage changes and a potential after the output voltage changes.

That is, a current path to allow the electric current through the current control element is formed when the switch of the series circuit is closed. In this state, when an electromotive force is generated in the motor due to the motor being rotated by disturbance, the detected output voltage does not indicate the change across the second threshold. In this way, since the determination of disconnection is made in two steps, the rotation of the motor due to the disturbance can be discriminated, and thus the disconnection can be properly detected. Further, the disconnection can be detected without increasing a dark current.

BRIEF DESCRIPTION OF THE DRAWINGS

The above and other objects, features and advantages of the present invention will become more apparent from the following detailed description made with reference to the accompanying drawings, in which like parts are designated by like reference numbers and in which.

DETAILED DESCRIPTION

First Embodiment

Figure 1:
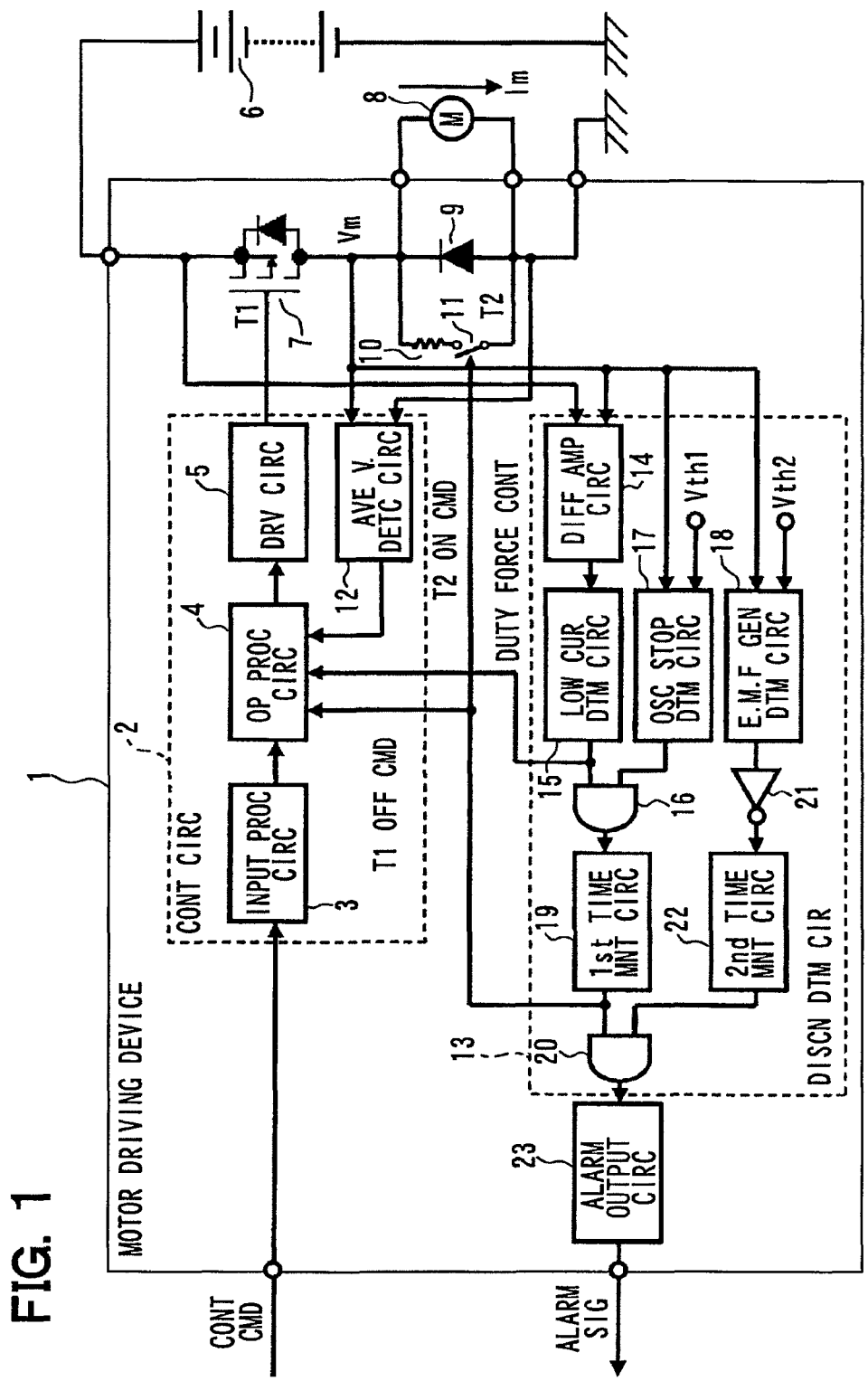
FIG. 1 is a block diagram of a motor driving device according to a first embodiment.

A first embodiment will be hereinafter described with reference to FIGS. 1 through 4. FIG. 1 is a block diagram illustrating a structure of a motor driving device 1 that drives a fan. The motor driving device 1 receives a control command from an upper control unit disposed external to the motor driving device 1. In the motor driving device 1, an input processing circuit 3 of an internal control circuit 2 receives the control command. For example, the control command is provided as a PWM signal (duty signal) having a low frequency, such as approximately 100 hertz (Hz). The input processing circuit 3 generates a voltage signal by integrating the PWM signal and transmits the voltage signal to an operation processing circuit 4.

Although not illustrated, the operation processing circuit 4 includes a circuit that generates a carrier wave such as a triangular wave. The operation processing circuit 4 generates a PWM output signal by comparing the voltage signal inputted thereto with the level of the carrier wave, or generates the PWM output signal by digital calculation according to the voltage signal inputted thereto. The operation processing circuit 4 transmits the PWM output signal to a driving circuit 5.

A series circuit of a P-channel MOSFET 7 and a motor 8 is connected between a battery 6 (voltage +B) as a power source and a ground. The P-channel MOSFET 7 serves as a driving switching element T1. The motor 8 is, for example, a fan motor.

The motor 8 is connected external to the motor driving device 1. A diode 9, and a series circuit of a resistor element 10 and a switch 11 (T2) are connected in parallel with the motor 8, but inside of the motor driving device 1. The diode 9 is connected in anti-parallel with the motor 8 and serves as a return current path forming unit that allows a return current when the driving switching element T1 is turned off. The resistor element 10 serves as a current flow restriction element. The switch 11 is, for example, provided by a switching element such as a transistor. The driving circuit 5 provides a driving signal (PWM signal) to a gate of the P-channel MOSFET 7. The motor driving device 1 is constructed as a high side driver.

An average voltage detection circuit 12 of the control circuit 2 detects the average of the voltage (output voltage) Vm applied to the motor 8. The average voltage detection circuit 12 provides a detection result to the operation processing circuit 4. The detection result corresponds to a target control voltage of the PWM control. Therefore, the operation processing circuit 4 performs feedback control so that the output voltage Vm coincides with the target control voltage.

The motor driving device 1 has a disconnection determination circuit 13 as a disconnection determination unit. A differential amplification circuit 14, which serves as a current detection element, detects a differential voltage between a source and a drain of the P-channel MOSFET 7 and amplifies the differential voltage to provide a differential voltage signal to a low current determination circuit 15. The differential voltage detected by the differential amplification circuit 14 is the product of an on resistance of the P-channel MOSFET 7 and a drain current flowing through the P-channel MOSFET 7. Therefore, the detection of the differential voltage is equivalent to the detection of the drain current.

The low current determination circuit 15 compares the value of the differential voltage signal provided from the differential amplification circuit 14 with a determination threshold, such as a voltage value corresponding to a threshold current Ith. When the value of the differential voltage signal is lower than the determination threshold, the low current determination circuit 15 determines a low current condition, and provides a determination signal indicating an active state (high level) to one of input terminals of an AND gate 16 as well as to the operation processing circuit 4.

The output voltage Vm is applied also to an oscillation stop determination circuit 17 as well as an electromotive force generation determination circuit 18. The oscillation stop determination circuit 17 is applied with a first threshold Vth1. The electromotive force generation determination circuit 18 is applied with a second threshold Vth2 that is lower than the first threshold Vth1 (Vth2<Vth1).

The oscillation stop determination circuit 17 detects an "oscillation stop" of an output side when the output voltage Vm does not change across the first threshold Vth1, that is, does not reduce lower than the first threshold Vth1 in an oscillation stop determination period, which will be described later. When the oscillation stop determination circuit 17 detects the "oscillation stop", the oscillation stop determination circuit 17 sets an oscillation stop detection signal to an active state (high level). The oscillation stop detection signal is transmitted to the other of the input terminals of the AND gate 16 as well as to the operation processing circuit 4.

It is to be noted that the above "oscillation stop" means a state where the output voltage Vm does not fluctuate (change) according to the PWM signal. Also, the first threshold Vth1 is set to a level that is lower than a minimum voltage level of a PWM off period in the state where the electric load is disconnected and is higher than a maximum voltage level when the P-channel MOSFET 7 (T1) is turned off and the switch 11 (T2) is turned on in the state where the electric load is disconnected.

An output signal of the AND gate 16 is transmitted to a first time monitoring circuit 19. In order to restrict erroneous determination due to external noise and the like, the first time monitoring circuit 19 is latched when a period of time where the output signal of the AND gate 16 indicates a high level continues over a predetermined monitoring period, and thus a high level signal is transmitted to one of the input terminals of an AND gate 20. This signal is also provided as a signal to control an on and off state of the switch 11. The output signal of the AND gate 16 becomes the high level when both the low current detection signal and the oscillation stop detection signal are in the active state.

The electromotive force generation determination circuit 18 detects the disconnection of the motor 8 when the output voltage Vm is lower than the second threshold Vth2 in an electromotive force generation checking period, which will be described later, and sets a disconnection detection signal to an active state (low level). The disconnection detection signal is transmitted to a second time monitoring circuit 22 through a NOT gate 21. An output signal from the second time monitoring circuit 22 is transmitted to the other of the input terminals of the AND gate 20.

In order to restrict erroneous determination due to external noise and the like, the second time monitoring circuit 22 is latched in a state where an electromotive force is not generated, that is, when a state where the output signal of the NOT gate 21 indicates a high level continues over a predetermined monitoring period, and thus a high level signal is outputted to the other of the input terminals of the AND gate 20. An output signal of the AND gate 20 is transmitted to an alarm output circuit 23. The alarm output circuit 23 outputs an alarm signal to an upper control device when the output signal of the AND gate 20 becomes a high level.

Figure 2:
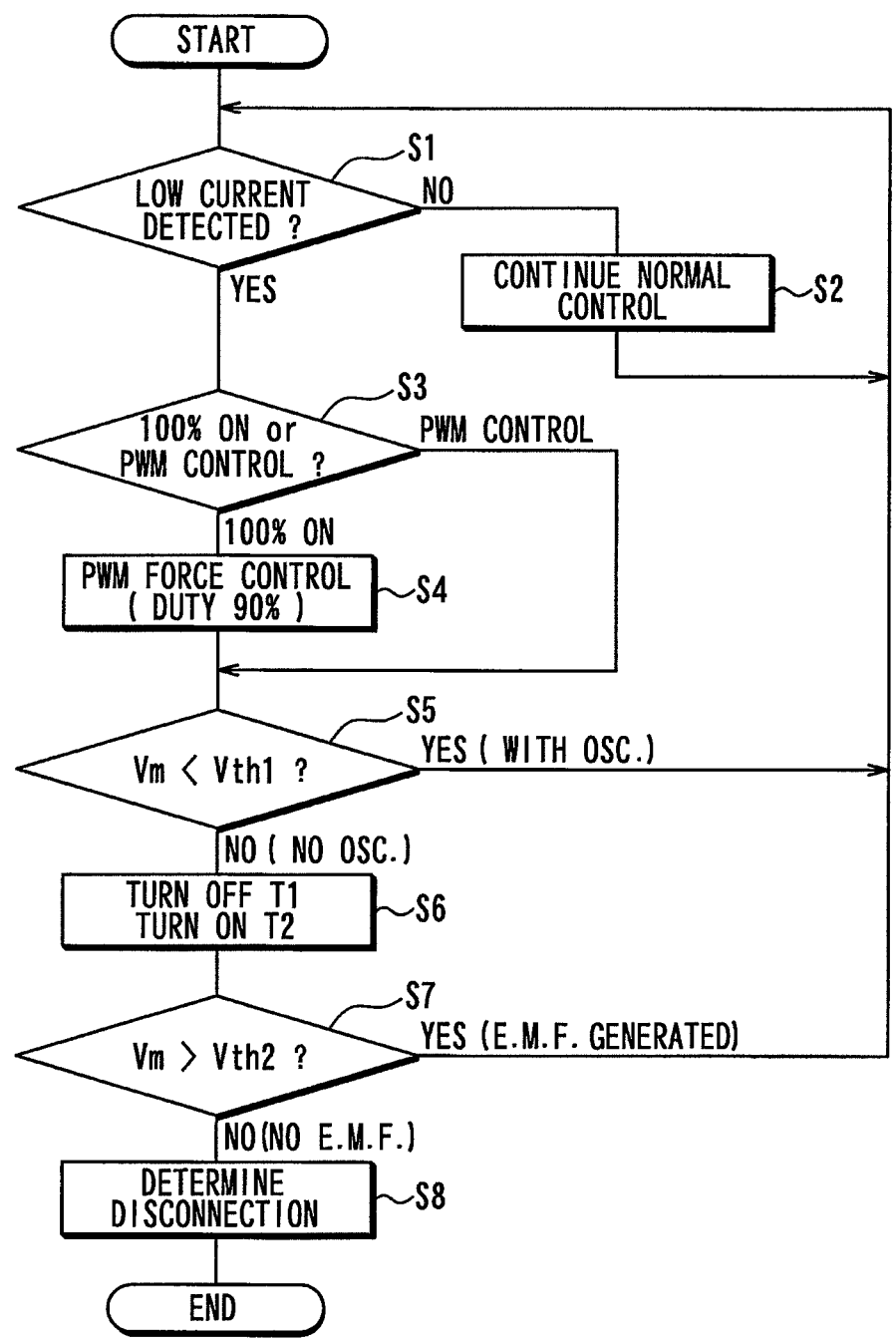
FIG. 2 is a flowchart illustrating a processing performed mainly by an operation processing circuit and a disconnection determination circuit of the motor driving device according to the first embodiment.

Next, an operation of the present embodiment will be described with reference to FIGS. 2 through 4. FIG. 2 is a flowchart illustrating a processing executed mainly by the control unit 2 including the operation processing circuit 4 and the disconnection determination circuit 13, but these operations are performed through a hard logic.

The operation processing circuit 4 determines whether or not a low current state is detected by the low current determination circuit 15, at S1. When the low current state is not detected, corresponding to "NO" at S1, a normal control of the motor 8 is performed, that is, an electric current supply to the motor 8 is continued at S2. When the low current state is detected, corresponding to "YES" at S1, there is a possibility that the motor 8 is disconnected. Therefore, at S3, it is determined whether or not the motor 8 is in a continuous conduction state at a duty of 100% at that time. When the motor 8 is in the continuous conduction state at the duty of 100% at S3, the control condition of the motor 8 is forcibly switched to a PWM control, such as at a duty of 90%, at S4, and the processing then proceeds to S5. When the motor 8 is in the PWM control state at S3, the processing directly proceeds to S5.

At S5, the PWM oscillation is checked. Namely, at S5, it is determined at the oscillation stop determination circuit 17 whether or not the output voltage Vm is lower than the first threshold Vth1. When the output voltage Vm is lower than the first threshold Vth1 (Vm<Vth1), corresponding to "YES" at S5, it is determined that the output voltage Vm fluctuates according to the PWM signal by a switching operation of the P-channel MOSFET 7, that is, the output voltage Vm is oscillated. Therefore, the processing returns to S1.

On the other hand, when the output voltage Vm is equal to or greater than the first threshold Vth1 (Vm≥Vth1), corresponding to "NO" at S5, it is determined that the output voltage Vm does not fluctuate according to the PWM signal by the switching operation of the P-channel MOSFET 7, that is, the output voltage Vm is not oscillated. In this case, since the oscillation stop determination circuit 17 sets the oscillation stop detection signal to the active state, the signal indicating a high level is outputted through the AND gate 16 and the first time monitoring circuit 19. As such, the operation processing circuit 4 stops the PWM control, and the switch 11 is turned on at S6. It is to be noted that a period of time where the determination is made at S5 corresponds to "oscillation stop checking period" (e.g., P1 in FIGS. 3B and 3C).

At S7, it is determined at the electromotive force generation circuit 18 whether or not the output voltage Vm is greater than the second threshold Vth2 (Vm>Vth2). When the output voltage Vm is greater than the second threshold Vth2, corresponding to "YES" at S7, it is assumed that an electromotive force is generated at a winding of the motor 8. For example, it is assumed that an electromotive force is generated at the winding of the motor 8 due to a fan being rotated by disturbance such as the wind. In this case, therefore, the processing returns to S1.

On the other hand, when the output voltage Vm is equal to or lower than the second threshold Vth2 at S7 (Vm≤Vth2), corresponding to "NO" at S7, it is assumed that the electromotive force is not generated at the winding of the motor 8, but the motor 8 is disconnected. Therefore, a high level signal is outputted through the NOT gate 21 and the second time monitoring circuit 22. With this, the output signal of the AND gate 20 becomes the high level at S8, and the alarm signal is outputted to an external device. It is to be noted that the period of time where the determination is made at S7 corresponds to an "electromotive force generation checking period" (e.g., P2 in FIGS. 3B and 3C).

Figure 3A:
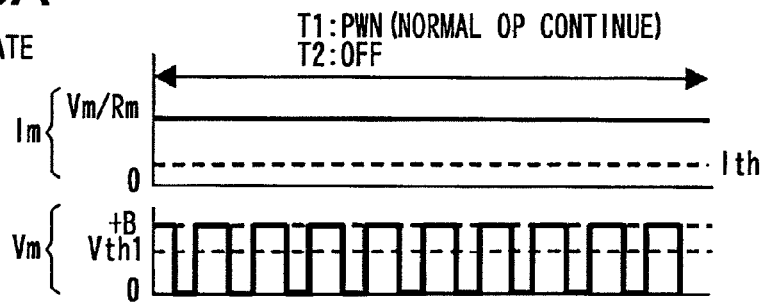
FIG. 3A is a waveform chart illustrating the change of an electric current Im and an output voltage Vm of the motor driving device under a PWM control, in a normal driving state, according to the first embodiment.
Figure 3B:
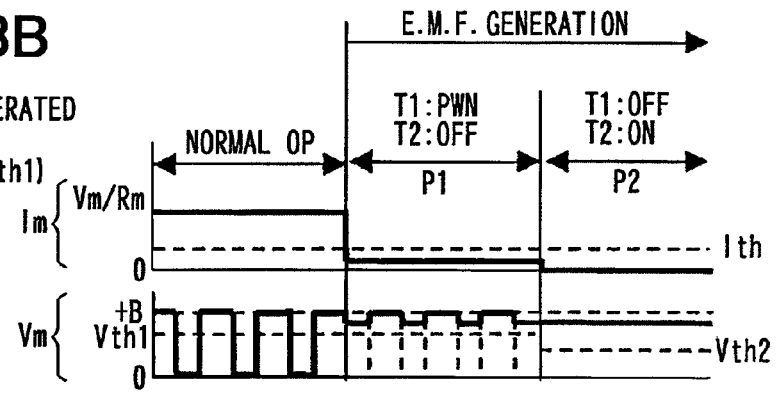
FIG. 3B is a waveform chart illustrating the change of the electric current Im and the output voltage Vm of the motor driving device under the PWM control, in a state where an electromotive force is generated at a winding of a motor, according to the first embodiment.
Figure 3C:
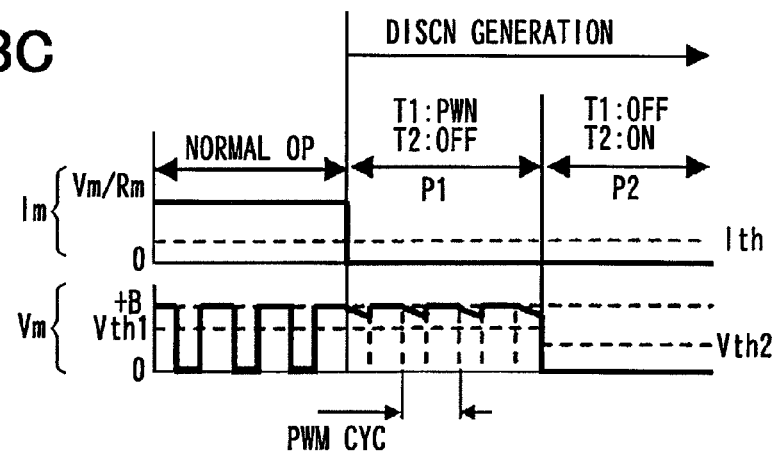
FIG. 3C is a waveform chart illustrating the change of the electric current Im and the output voltage Vm of the motor driving device under the PWM control, in a state where the motor is disconnected, according to the first embodiment.

FIGS. 3A through 3C are waveform charts indicating the change of an electric current Im flowing through the motor 8 and the output voltage Vm when the PWM control of the motor 8 is performed by the operation processing circuit 4. For example, FIG. 3A illustrates the waveforms of the electric current Im and the output voltage Vm in a normal driving state. Although the low level of the output voltage Vm is exemplarily indicated as 0 V corresponding to the ground level, a return current flows through the diode 9 during a period where the P-channel MOSFET is turned off and thus the low level of the output voltage Vm is actually at a negative potential that is lower than 0 V by a forward voltage Vf of the diode 9.

FIG. 3B illustrates the waveforms of the electric current Im and the output voltage Vm in a state where the electromotive force is generated at the winding of the motor 8. The value of the electric current Im detected at the low current determination circuit 17 in the oscillation stop checking period P1, which corresponds to the monitoring period of the first time monitoring circuit 19, is lowered. However, the electromotive voltage is superimposed on the output voltage Vm. Therefore, the output voltage Vm is greater than the first threshold Vth1. Further, even if the PWM control is stopped in the electromotive force generation checking period P2, which corresponds to the monitoring period of the second time monitoring circuit 22, the electromotive force is greater than the second threshold Vth2. Therefore, the generation of the electromotive force can be determined.

FIG. 3C illustrates the waveforms of the electric current Im and the output voltage Vm in a state where the motor 8 is disconnected. Although the electric current Im detected at the low current determination circuit 17 in the oscillation stop checking period P1 is lowered, the output voltage Vm is substantially equal to the power source voltage +B. When the PWM control is stopped in the electromotive force generation checking period P2, the output voltage Vm is reduced than the second threshold Vth2. Therefore, the disconnection of the motor 8 can be determined.

Figure 4A:
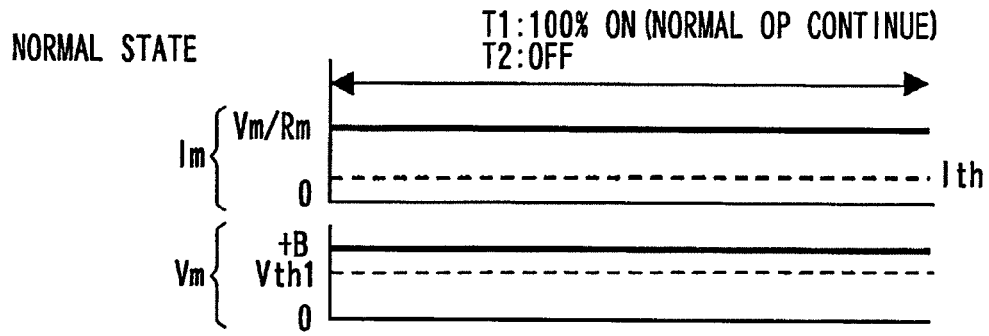
FIG. 4A is a waveform chart illustrating the change of an electric current Im and an output voltage Vm when the motor is continuously energized, in a normal driving state, according to the first embodiment.
Figure 4B:
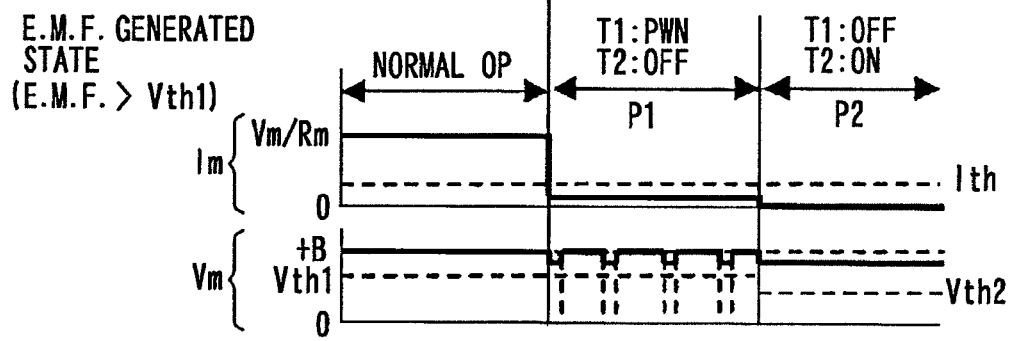
FIG. 4B is a waveform chart illustrating the change of the electric current Im and the output voltage Vm when the motor is continuously energized, in a state where the electromotive force is generated at the winding of the motor, according to the first embodiment.
Figure 4C:
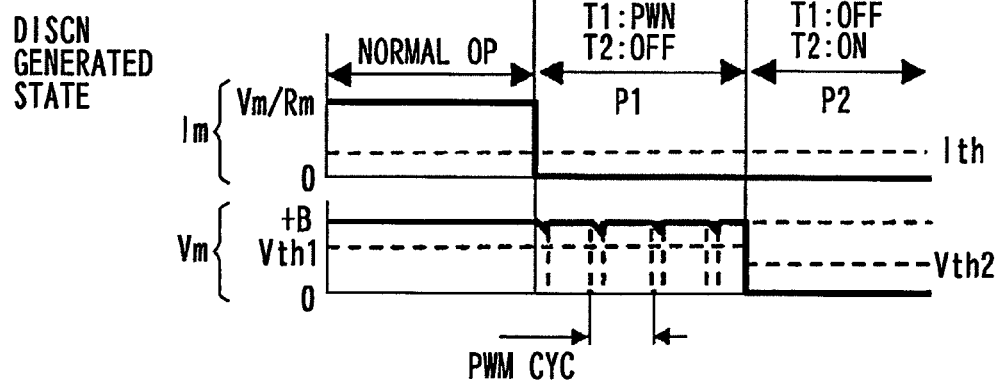
FIG. 4C is a waveform chart illustrating the change of the electric current Im and the output voltage Vm when the motor is continuously energized, in a state where the motor is disconnected, according to the first embodiment.

FIGS. 4A through 4C are waveform charts illustrating the change of the electric current Im flowing through the motor 8 and the output voltage Vm when the operation processing circuit 4 continuously energizes the motor 8 at the duty of 100%. For example, FIG. 4A illustrates the waveforms of the electric current Im and the output voltage Vm in the normal driving state. In the normal driving state, the output voltage Vm is equal to the power source voltage +B.

FIG. 4B illustrates the waveforms of the electric current Im and the output voltage Vm in the state where the electromotive force is generated at the winding of the motor 8. The electric current Im detected at the low current determination circuit 17 is lowered in the oscillation stop checking period P1. However, when the PWM control is performed at the duty of 90%, the electromotive voltage is superimposed on the output voltage Vm. Therefore, the output voltage Vm is higher than the first threshold Vth1, similar to the output voltage Vm of FIG. 3B. Further, when the PWM control is stopped in the electromotive force generation checking period P2, the electromotive voltage Vth2 is higher than the second threshold Vth2. Therefore, the generation of the electromotive force can be determined.

FIG. 4C illustrates the waveforms of the electric current Im and the output voltage Vm in the state where the motor 8 is disconnected. The electric current Im and the output voltage Vm change in the oscillation stop checking period P1 and the electromotive force generation checking period P2, in the similar manner to those of FIG. 3C. Therefore, the disconnection of the motor 8 can be determined.

In a case where the duty ratio of the PWM signal has a lower limit, the disconnection of the motor 8 can properly detected. For example, it is assumed that, when the motor voltage exceeds the target control voltage due to the electromotive voltage generated by the motor 8, the PWM oscillation is not generated due to the control circuit 2 turning off the switching element 11, and thus the disconnection is erroneously detected or cannot be detected. Therefore, the disconnection can be properly detected by providing the duty ratio of the PWM signal with the lower limit.

Figure 12:
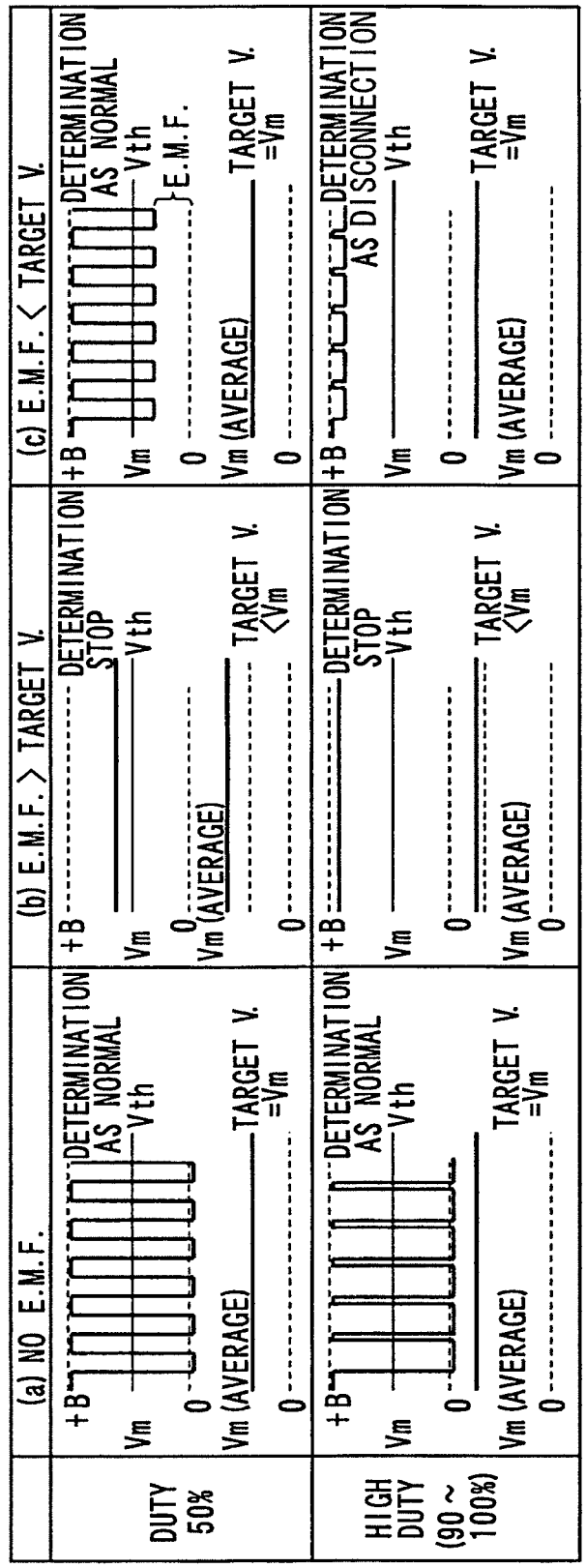
FIG. 12 is a chart explaining a control operation of a motor driving device as a comparative example.

FIG. 12 is a chart explaining a control operation of a motor driving device as a comparative example, which has a similar structure to JP2001-298988A. In the motor driving device as the comparative example, as shown in (b) of FIG. 12, when the driving voltage Vm is higher than a target driving voltage, the output of the control signal (PWM signal) is stopped so as to avoid erroneous detection of the disconnection. However, when the motor is continuously energized at the duty of 100%, or when the motor is driven at a duty about 100%, if an electromotive force is generated in a state where the output voltage Vm is slightly lower than the target driving voltage, the PWM oscillation becomes in a state of seemingly being stopped, similar to the state of disconnection. Therefore, the oscillation cannot be detected, and thus the disconnection may be erroneously detected, as shown in (c) of FIG. 12. In addition, in a structure where the resistor element is connected in parallel with the transistor, a dark current increases.

On the other hand, in the motor driving device 1 of the present embodiment, which is the high side driver where the motor 8 is driven by the P-channel MOSFET 7, the disconnection determination circuit 13 compares the output voltage Vm detected at the common connecting point between the motor 8 and the P-channel MOSFET 7 with the first threshold Vth1, and determines whether the output voltage Vm fluctuates according to the PWM signal. When the output voltage Vm does not fluctuate according to the PWM signal, the disconnection determination circuit 13 prohibits the output of the PWM signal and closes the switch 11 of the series circuit connected in parallel with the motor 8. In this state, when the output voltage Vm reduces lower than the second threshold Vth2, the disconnection determination circuit 13 determines that the motor 8 is disconnected. In this way, the determination of the disconnection is made in two steps. Therefore, the disconnection of the motor 8 can be properly detected, while discriminating the rotation of the motor 8 due to the disturbance. Also, the disconnection of the motor 8 can be detected without increasing the dark current.

In the case where the control circuit 2 continuously supplies the electric current to the motor 8, when the electric current Im of the motor 8 is lower than the predetermined determination threshold Ith, the duty ratio of the PWM signal is set to a value lower than 100% and, in this state, the disconnection determination circuit 13 compares the output voltage Vm with the first threshold Vth1. That is, in the state where the motor 8 is continuously energized, the electric current Im should be at the maximum level and be greater than the determination threshold Ith. In such a situation, if the electric current Im is lower than the determination threshold Ith, there is a possibility that the motor 8 is disconnected. Therefore, the disconnection can be detected even when the motor 8 is continuously energized.

In addition, the control circuit 2 provides the lower limit to the duty ratio of the PWM signal when outputting the PWM signal in the feedback control based on the voltage outputted to the motor 8. Therefore, in the normal state where the motor 8 is not disconnected, the output voltage Vm can be properly fluctuated according to the PWM signal.

Second Embodiment

Figure 6A:
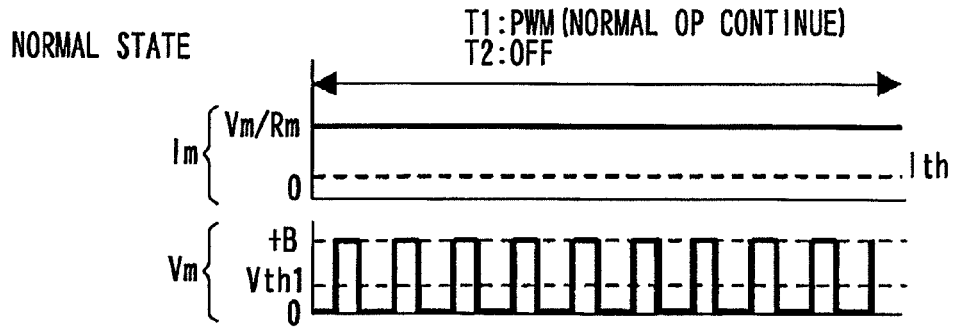
FIG. 6A is a waveform chart illustrating the change of an electric current Im and an output voltage Vm of the motor driving device under a PWM control, in a normal driving state, according to the second embodiment.
Figure 6B:
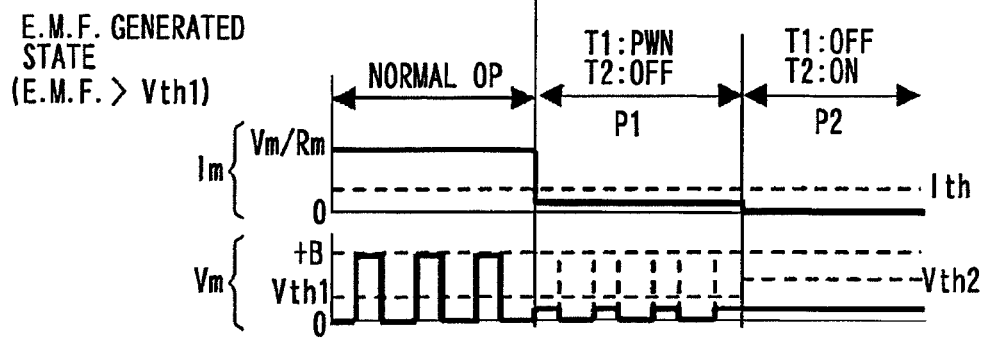
FIG. 6B is a waveform chart illustrating the change of the electric current Im and the output voltage Vm of the motor driving device under the PWM control, in a state where an electromotive force is generated at a winding of a motor, according to the second embodiment.
Figure 6C:
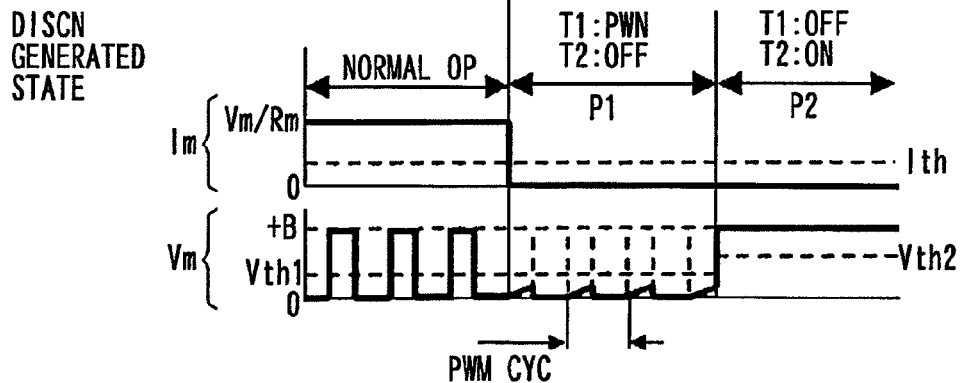
FIG. 6C is a waveform chart illustrating the change of the electric current Im and the output voltage Vm of the motor driving device under the PWM control, in a state where the motor is disconnected, according to the second embodiment.
Figure 7A:
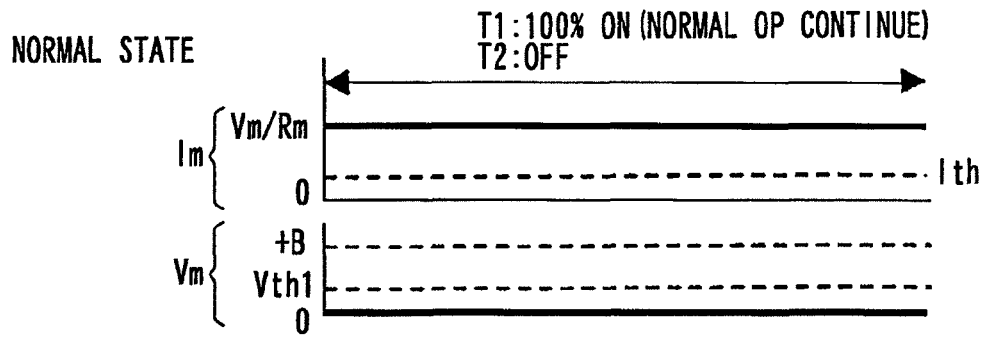
FIG. 7A is a waveform chart illustrating the change of an electric current Im and an output voltage Vm when the motor is continuously energized, in a normal driving state, according to the second embodiment.
Figure 7B:
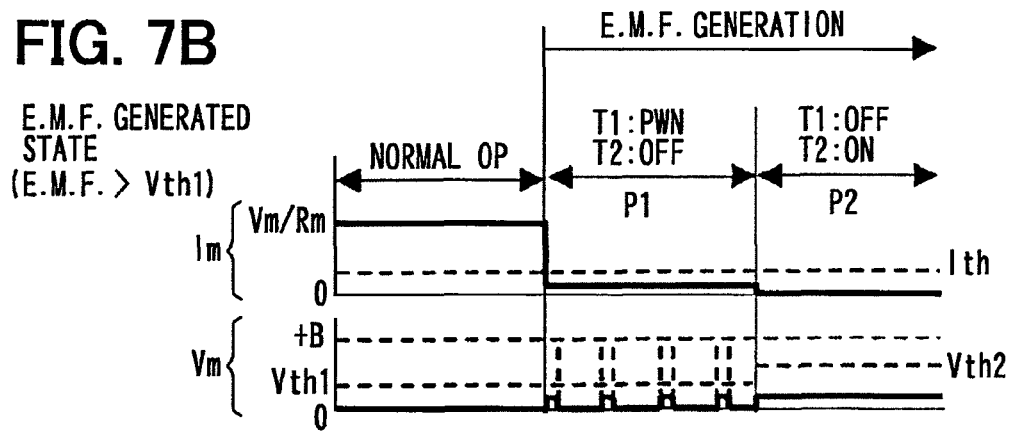
FIG. 7B is a waveform chart illustrating the change of the electric current Im and the output voltage Vm when the motor is continuously energized, in a state where the electromotive force is generated at the winding of the motor, according to the second embodiment.
Figure 7C:
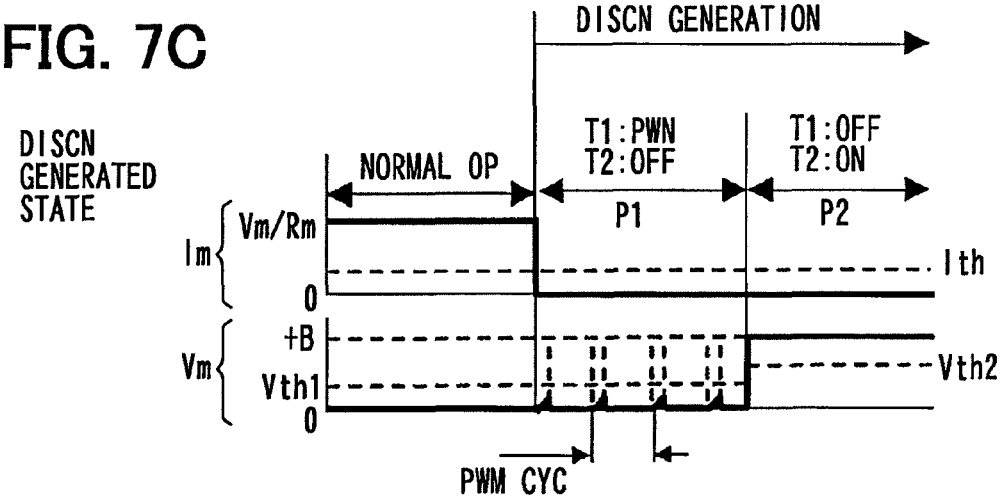
FIG. 7C is a waveform chart illustrating the change of the electric current Im and the output voltage Vm when the motor is continuously energized, in a state where the motor is disconnected, according to the second embodiment.

A second embodiment will be described with reference to FIGS. 5 through 7. Like parts are designated with like reference numerals, and a description thereof will not be repeated. Hereinafter, a different structure will be mainly described.

Figure 5:
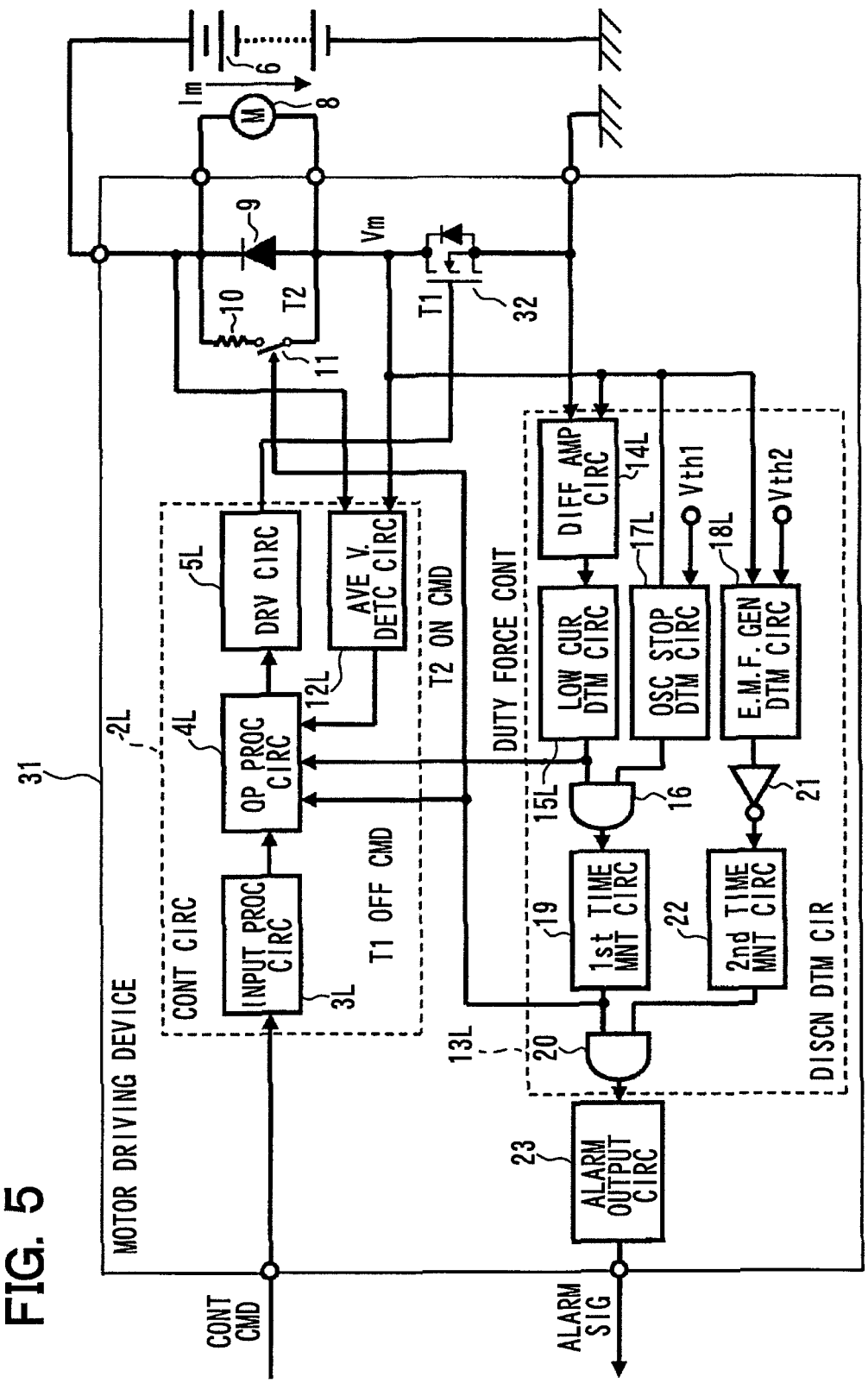
FIG. 5 is a block diagram of a motor driving device according to a second embodiment.

As shown in FIG. 5, a motor driving device 31 of the present embodiment is constructed as a low side driver that drives the motor 8 by an N-channel MOSFET 32 as a driving switching element T1. The source of the N-channel MOSFET 32 is grounded. The motor 8, the diode 9 and the series circuit of the resistor element 10 and the switch 11 are connected in parallel with each other between a positive terminal of the battery 6 and the drain of the N-channel MOSFET 32. The potential at the drain corresponds to the output voltage Vm.

An average voltage detection circuit 12L of a control circuit 2L detects the voltage between the positive terminal of the battery 6 and the drain of the N-channel MOSFET 32. A differential amplification circuit 14L of a disconnection determination circuit 13L detects a differential voltage between the drain potential of the N-channel MOSFET 32 and the ground potential, and amplifies the differential voltage to provide a differential voltage signal to a low current determination circuit 15L. The oscillation stop determination circuit 17L is applied with a first threshold Vth1, and the electromotive force generation determination circuit 18L is applied with a second threshold Vth2. In the present embodiment, the first threshold Vth1 and the second threshold Vth2 have an inverse relationship to that of the first embodiment. That is, in the present embodiment, the first threshold Vth1 is smaller than the second threshold Vth2.

The oscillation stop determination circuit 17L outputs an oscillation stop detection signal indicating a high level when the output voltage Vm is lower than the first threshold Vth1 in the oscillation stop checking period P1. The electromotive force generation determination circuit 18 outputs an electromotive force generation checking signal indicating a high level when the output voltage Vm is higher than the second threshold Vth2 in the electromotive force generation checking period P2.

FIGS. 6A through 6C and FIGS. 7A through 7C are waveform charts respectively corresponding to FIGS. 3A through 3C and FIGS. 4A through 4C. The waveforms of FIGS. 6A through 6C and FIGS. 7A through 7C are different from those of FIGS. 3A through 3C and FIGS. 4A through 4C because the output voltage Vm is lower than the first threshold Vth1 in the oscillation stop checking period P1 under the PWM control, and the output voltage Vm changes over the second threshold Vth2 in the electromotive force generation checking period P2 if the motor 8 is disconnected. In the present embodiment, therefore, the inequality signs for the determinations at S5 and S7 are reversed from those of the first embodiment.

As described above, in the present embodiment, the motor driving device 32 is the low side driver that drives the motor 8 by the N-channel MOSFET 32 in the low side drive manner. In the motor driving device 32, the disconnection determination circuit 13L sets the second threshold Vth2 to the value greater than the first threshold Vth1. Therefore, the change of the output voltage Vm toward the power source voltage +B across the second threshold Vth 2 due to the disconnection can be seized.

Third Embodiment

A third embodiment will be described with reference to FIGS. 8 and 9. Hereinafter, a structure different from the first embodiment will be mainly described.

Figure 8:
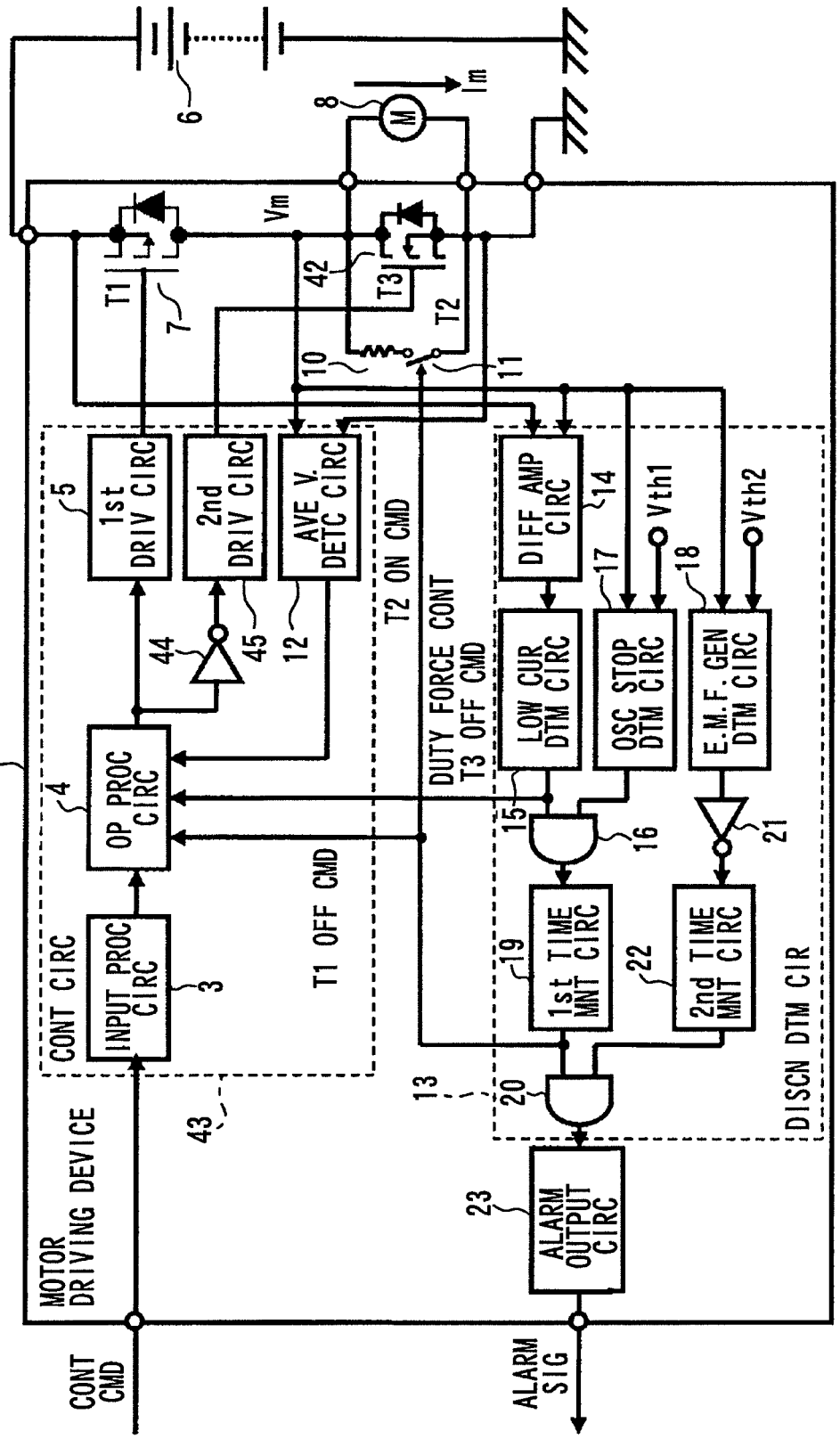
FIG. 8 is a block diagram of a motor driving device according to a third embodiment.
Figure 9:
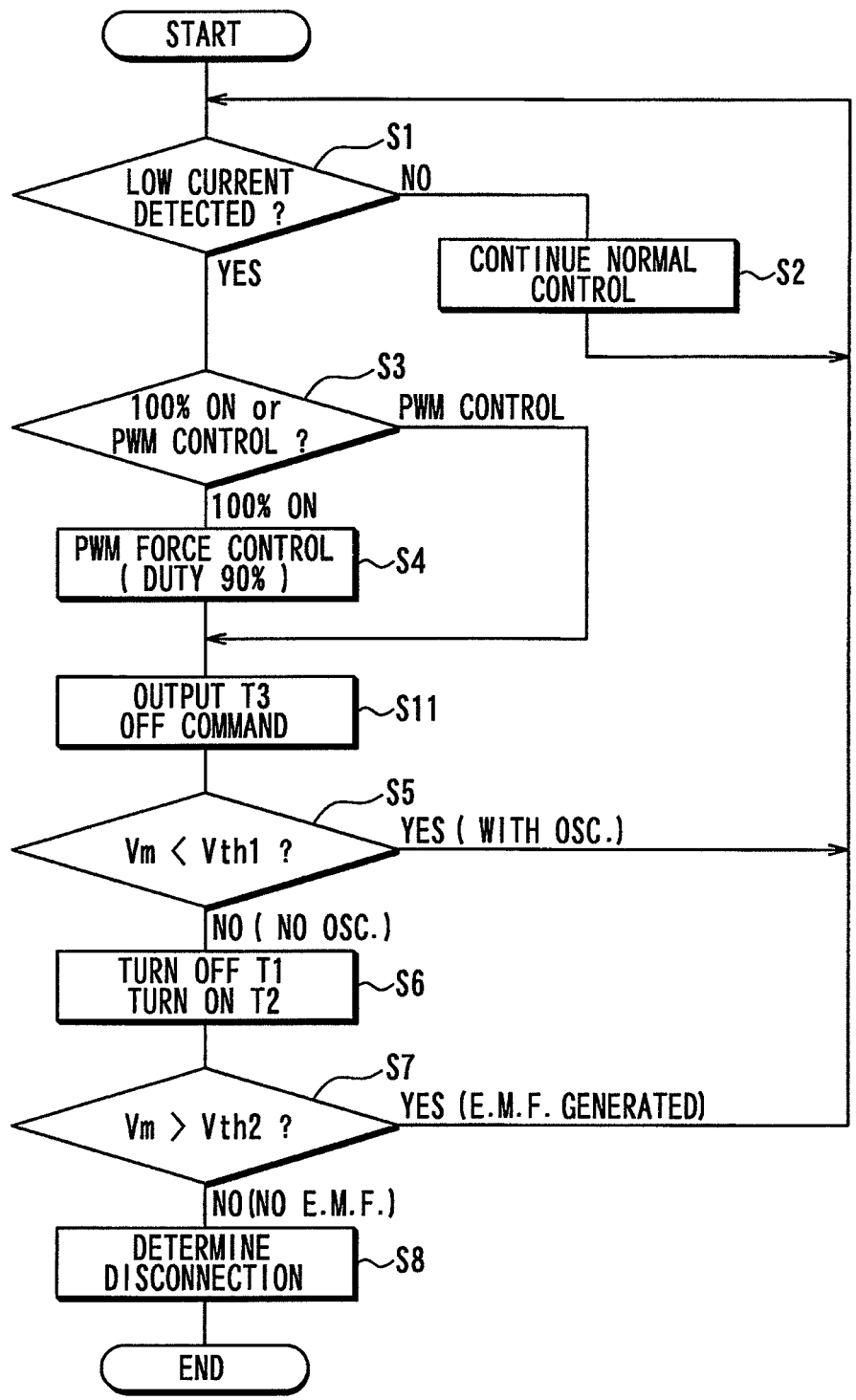
FIG. 9 is a flowchart illustrating a processing performed mainly by an operation processing circuit and a disconnection determination circuit of the motor driving device according to the third embodiment.

As shown in FIG. 8, a motor driving device 41 of the present embodiment has an N-channel MOSFET 42 as the return current path forming unit and a return current switching element T3, in place of the diode 9 of the motor driving device 1 of the first embodiment. In a control circuit 43, the output signal of the operation processing circuit 4 is transmitted to the gate of the N-channel MOSFET 42 through a NOT gate 44 and a second driving circuit 45 to switch the operation of the N-channel MOSFET 42.

The N-channel MOSFET 42 is turned on when the P-channel MOSFET 7 is in the off state, so that return current flows between the source and drain without through a body diode of the N-channel MOSFET 42. That is, the N-channel MOSFET 42 is employed to conduct synchronous rectification so as to reduce loss. When the low current detection signal outputted from the low current determination circuit 17 becomes the active state, the control circuit 43 forcibly performs the PWM control by setting the duty ratio to 90% at S4 in a case where the motor 8 is continuously energized. Further, at S11, the control circuit 43 stops the synchronous rectification by turning off the N-channel MOSFET 42.

That is, even if the motor 8 is disconnected, it is detected as if the output voltage Vm fluctuates according to the PWM signal when the synchronous rectification is performed. In the present embodiment, therefore, the synchronous rectification is stopped when there is a possibility of disconnection due to the detected electric current Im being lower than the determination threshold Ith. Accordingly, disconnection of the motor 8 can be properly detected.

Fourth Embodiment

A fourth embodiment will be described with reference to FIG. 10. In the fourth embodiment, a snubber circuit is added to the high side driver of the first embodiment.

Figure 10:
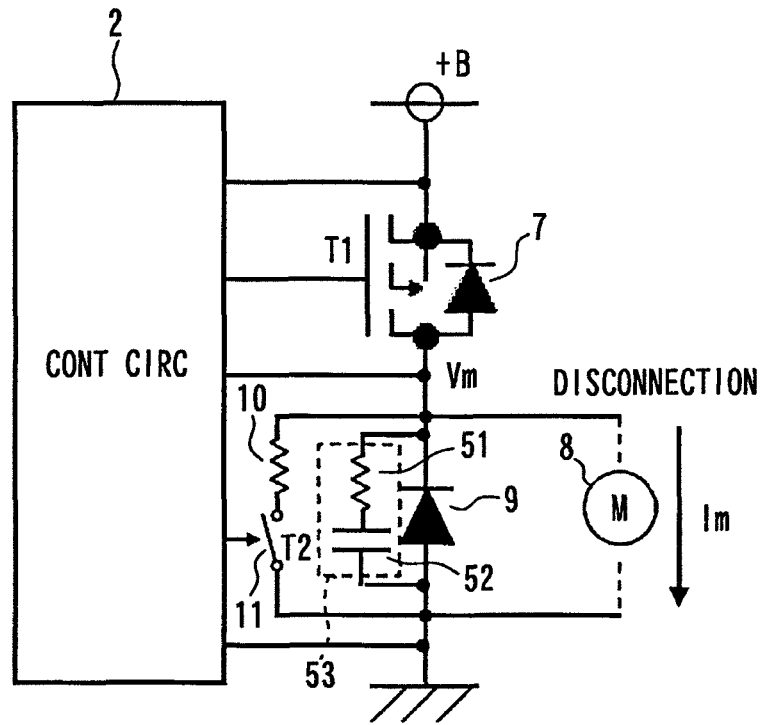
FIG. 10 is a part of a motor driving device according to a fourth embodiment.

As shown in FIG. 10, a snubber circuit 53 is a series circuit of a resistor element 51 and a capacitor 52, and is connected in parallel with the diode 9. In such a structure, the output voltage Vm can be further stably detected when the disconnection is generated in the motor 8. Further, noise generated when the P-channel MOSFET 7 is switched can be reduced.

Fifth Embodiment

A fifth embodiment will be described with reference to FIG. 11. In the fifth embodiment, a snubber circuit 53 is added to the high side driver of the first embodiment.

Figure 11:
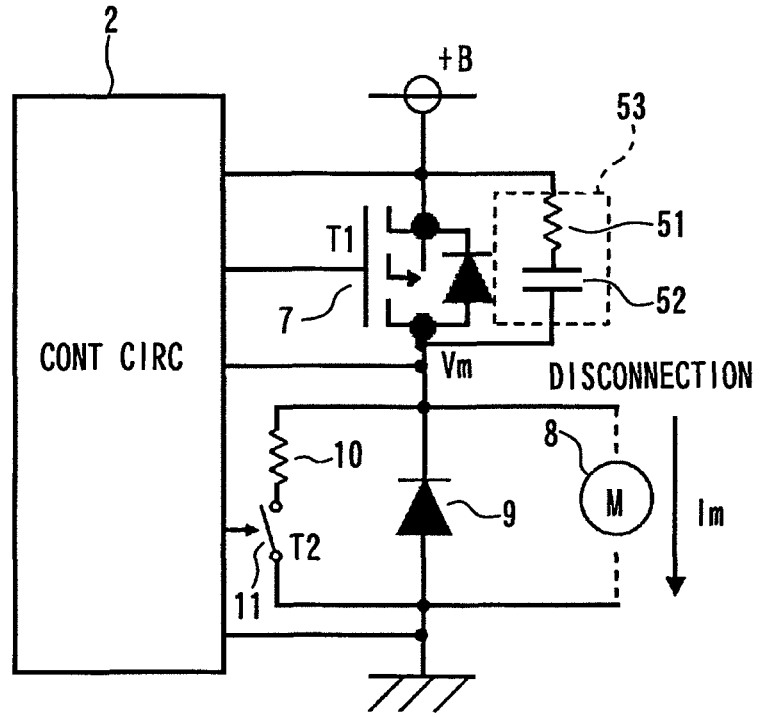
FIG. 11 is a part of a motor driving device according to a fifth embodiment.

As shown in FIG. 11, the snubber circuit 53, which is the series circuit of the resistor element 51 and the capacitor 52, is connected in parallel with the P-channel MOSFET 7. In such a structure, the similar advantageous effects to the fourth embodiment can be achieved.

In the above described embodiments, the disconnection determination circuit 13 prohibits the output of the PWM signal when the output voltage Vm does not fluctuates according to the PWM signal as a result of comparing the output voltage Vm with the first threshold Vth1, because there is a possibility that the motor 8 is disconnected in that state. Further, the disconnection determination circuit 13 determines that the motor 8 is disconnected on condition that the output voltage Vm detected in the state where the output of the PWM signal is stopped and the switch 11 of the series circuit is closed indicates the change across the second threshold Vth2. Here, the "change across the second threshold" includes a change where the output voltage Vm changes from a value greater than the second threshold Vth2 to a value lower than the second threshold Vth2, and a change where the output voltage Vm changes from a value lower than the second threshold Vth2 to a value higher than the second threshold Vth2.

The present disclosure is not limited to the above described exemplary embodiments, but may be expanded or modified in various other ways, such as in the following manners:

The first threshold Vth1 and the second threshold Vth2 may be set to an equal value.

The current flow restriction element is not limited to the resistor element 10, but may be provided any other power sources.

The functions of the control circuit 2 and/or the disconnection determination circuit 13 may be implemented by software.

The switching element is not limited to the MOSFET, but may be provided by any other elements, such as a bipolar transistor and an IGBT.

In a case where the motor 8 is not continuously energized at the duty of 100%, the current detection element and the determination at S1 may be eliminated.

The low side driver of the second embodiment may have a snubber circuit, similar to the fourth embodiment.

While the present disclosure has been described with reference to exemplary embodiments thereof, it is to be understood that the disclosure is not limited to the above described exemplary embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor driving device for driving a motor, comprising:
    a driving switching element that is connected in series with the motor between a power source and a ground, and is operated by a pulse width modulation signal to drive the motor;
    a return current path forming unit that is connected in parallel with the motor and provides a current path to allow a return current when the driving switching element is turned off;
    a series circuit that includes a current flow restriction element and a switch connected in series with the current flow restriction element, the series circuit being connected in parallel with the return current path forming unit;
    a control circuit that provides the pulse width modulation signal to a control terminal of the driving switching element; and
    a disconnection determination unit that prohibits the control circuit from outputting the pulse width modulation signal and closes the switch of the series circuit when it is determined that a voltage without having fluctuation according to the pulse width modulation signal is applied to the motor as a result of comparing a voltage detected at a common connecting point between the motor and the driving switching element with a first threshold, and determines a disconnection of the motor on condition that the voltage detected in a state where output of the pulse width modulation signal is prohibited and the switch of the series circuit is closed indicates a change across a second threshold.

2. The motor driving device according to claim 1, further comprising:
    a current detection element that detects an electric current supplied to the motor through the driving switching element, wherein
    in a case where the control circuit continuously supplies the electric current to the motor, the disconnection determination unit determines whether the electric current detected by the current detection element is lower than a predetermined threshold and, when the detected electric current is lower than the determination threshold, compares the voltage with the first threshold in a state where a duty ratio of the pulse width modulation signal is set to a level lower than 100%.

3. The motor driving device according to claim 2, wherein
    the return current path forming unit includes a return current switching element connected in parallel with the motor, and
    the control circuit controls the return current switching element to an on state in a period where the driving switching element is in an off state, and, stops an operation of the return current switching element when the disconnection determination unit determines that the electric current detected by the current detection element is lower than the predetermined threshold.

4. The motor driving device according to claim 1, wherein
    the control circuit sets a lower limit of a duty ratio of the pulse width modulation signal when the pulse width modulation signal is outputted by a feedback control based on the voltage detected at the common connecting point.

5. The motor driving device according to claim 1, further comprising:
    a snubber circuit that is connected in parallel with one of the motor and the driving switching element.

6. The motor driving device according to claim 1, wherein
    the driving switching element is disposed upstream of the motor with respect to the power source to drive the motor in a high side manner, and
    the second threshold is equal to or lower than the first threshold.

7. The motor driving device according to claim 1, wherein
    the driving switching element is disposed downstream of the motor with respect to the power source to drive the motor in a low side manner, and
    the second threshold is equal to or greater than the first threshold.

* * * * *